United States Patent
Yamada et al.

(10) Patent No.: US 6,320,293 B1
(45) Date of Patent: Nov. 20, 2001

(54) ELECTRIC MOTOR HAVING BRUSHES AND COMMUTATOR OF ARMATURE

(75) Inventors: Takahiro Yamada, Toyohashi; Toshiyasu Ishizuka, Hamamatsu; Hisashi Masui; Akihiro Suzuki, both of Kosai; Kazushi Sugishima, Hamamatsu, all of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/538,268

(22) Filed: Mar. 30, 2000

(30) Foreign Application Priority Data

Oct. 4, 1999 (JP) .................................................. 11-283078

(51) Int. Cl.[7] .................................................. H02K 39/08
(52) U.S. Cl. ............................ 310/233; 310/234; 310/235
(58) Field of Search ................................ 310/231, 233, 310/234, 236, 204, 179, 206; 29/596–598

(56) References Cited

U.S. PATENT DOCUMENTS 5,760,517 * 6/1998 Stolpmann .
5,929,579 * 7/1999 Hsu .
6,127,759 * 10/2000 Tanaka et al. .

FOREIGN PATENT DOCUMENTS 61-112556    5/1986   (JP) .
7-44810      5/1995   (JP) .

* cited by examiner

Primary Examiner—Tran Nguyen
(74) Attorney, Agent, or Firm—Law Offices of David G. Posz

(57) ABSTRACT

In a commutator of an armature of an electric motor, a plurality of segments are arranged on the outer peripheral surface of a commutator ring at equal angular intervals. The segments which are in the same phase and oppose with 180° angular interval are connected through a conductive plate. Each conductive plate is spaced apart a predetermined distance from adjacent ones in the axial direction not to short, and molded within the commutator ring. Each of brushes is shaped to have a width which is sufficient to bridge over three segments. Alternatively, the commutator ring may be shaped to have a tapering protrusion part (25c) and the same-phase segments may be directly connected by a shorting wire along the tapering protrusion part.

12 Claims, 4 Drawing Sheets

ELECTRIC MOTOR HAVING BRUSHES AND COMMUTATOR OF ARMATURE

CROSS REFERENCE TO RELATED APPLICATION

This application relates to and incorporates herein by reference Japanese Patent Application No. 11-283078 filed on Oct. 4, 1999.

BACKGROUND OF THE INVENTION

The present invention relates an electric motor having power supply brushes and a commutator of an armature.

In conventional direct current motors having power supply brushes, multiple (for instance, four) brushes are used to reduce load current for each brush when high output is required. It is most desired that two same-polarity brushes contact two segments of a commutator at the same time.

It is however difficult in practice to cause the two same-polarity brushes to contact the corresponding segments at the same time. As a result, the timings of contact of the brushes differ. The timing of power supply to the armature is imbalanced when current flows in one of armature windings. This imbalance will cause fluctuation in the motor rotation, vibration, unusual noise and the like.

These fluctuation in the motor rotation, vibration and unusual noise arising secondarily will lessen response characteristics in operation, cause discomfort and the like in the case that the motor is applied, for instance, to home appliances and automotive devices such as an electric power steering device.

In the conventional motor, therefore, the windings are shorted by shorting wires between the same-phase segments to provide strapping connection. This connection reduces the fluctuation in the motor rotation, vibration and unusual noise.

The conventional strapping connection requires a separate special winding process. The winding work increases, because each shorting wire is wound around a slotted core of an armature. The armature and hence the electric motor thus result in high cost. Further, the shorting wire would cause undesirable influence to the armature in respect of inductance and the like, because it is wound a rather long distance.

Further, in the armature with the strapping connection, the conventional brushes which contact the segments of the armature has a narrow segment-contacting surface. The brush has only a width sufficient to bridge at most two segments at the same time. As a result, the brushes of the same polarity cannot contact the same-phase segments at the same time, when the interval between the same-polarity brushes varies. This results in variations in the contact timing.

That is, when one brush contacting a segment leaves from one segment and contacts the next segment, it may happen that the other brush cannot contact another segment which follows a segment which is in the same phase as the one segment contacted by the one brush. In this instance, when the one segment leaves the one segment and contacts the next segment, the voltage applied to from the brush to the next segment cannot be absorbed causing sparks and noises. This is an impediment to prolong the life of the electric motor and to reduce noises.

SUMMARY OF THE INVENTION

It is therefore an object of the present invention to provide an electric motor and a commutator of an armature which is capable of reducing motor rotation fluctuation, vibrations and noises as well as prolonging its product life.

According to the present invention, each of same-phase segments of a commutator is shorted by a shorting member, and each power supply brush normally contacts at least two segments. The shorting member may be a conductive plate or wire. As a result, even when one power supply brush of a plurality of power supply brushes of the same polarity respectively contacting the same-phase segments dislocates or jumps not to contact one of the segments, the other power supply brush of the same polarity contacts the other same-phase segment without fail. Thus, current flows to the one same-phase segment through the shorting member.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

The present invention will be described hereinunder with reference to embodiments which are applied to an electric motor having power supply brushes.

(First Embodiment)

Figure 1:
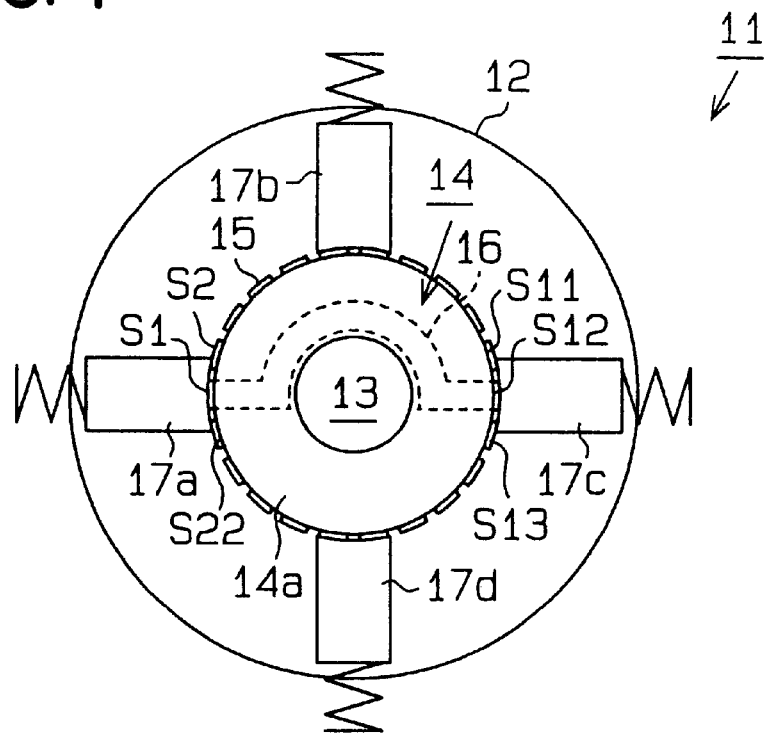
FIG. 1 is a plan view showing a positional relationship between a commutator and brushes of an electric motor according to a first embodiment of the present invention.

Referring first to FIG. 1, an armature 11 of a direct current motor is comprised of a slotted core 12, a rotary shaft 13 passing through the slotted core 12, and a commutator 14 fixed to the rotary shaft 13 at one end of the rotary shaft 13.

In the commutator 14, a plurality (for instance, 22) of segments 15 (1st segment S1–22nd segment S2) are disposed at equal angular intervals on the outer circumferential periphery of a commutator ring 14a made of an insulating material. The twenty-two segments 15 comprises segments which oppose with 180° angular interval to be in the same phase to each other. Each set of two segments 15 in the same phase are electrically connected by a conductive plates 16. The conductive plate 16 is embedded in the commutator ring 14a as a shorting member.

Figure 3A:
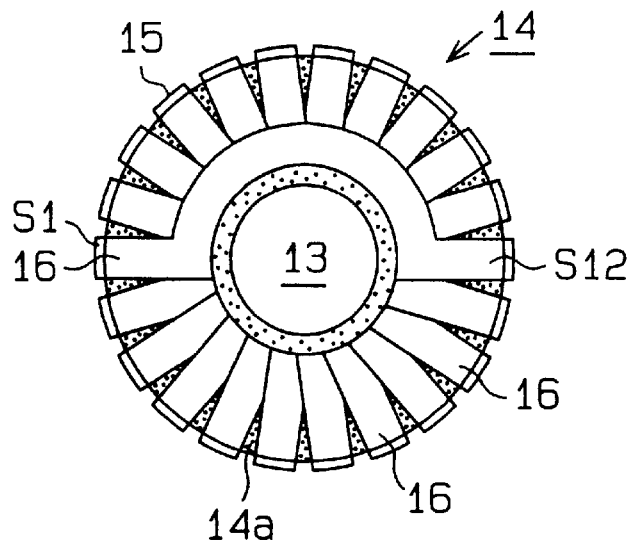
FIGS. 3A and 3B are sectional views showing the commutator in the first embodiment.

Specifically, as shown in FIG. 3A, each segment 15 extends in parallel with the axis of the rotary shaft 13. The same-phase segments, for instance, the 1st segment S1 and the 12th segment S12, are connected by the conductive plate 16 extending from the inside surfaces of the two opposing segments. The conductive plate 16 is bent in a semi-circular or arcuate shape in a manner to bypass the rotary shaft 13.

Figure 3B:
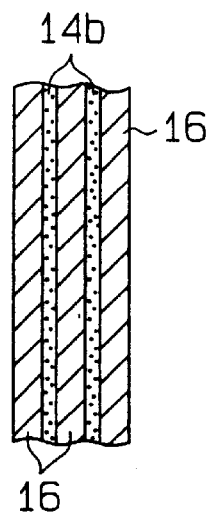

With regard the position of the conductive plate 16 relative to each segment, as shown in FIG. 3B, each conductive plate 16 connecting the same-phase segments 15 is displaced from the adjacent plates in the axial direction of the rotary shaft 13 so that the plates are not shorted. The same-phase segments connected by the displaced conductive plates 16 are shaped by press-machining a copper plate. The same-phase segments connected by the displaced conductive plate 16 are positioned so that the conductive plates 16 are not shorted. The commutator 14 is formed by molding these parts with an insulating resin 14a and 14b.

Four brushes 17a–17d are disposed around the commutator 14 to slidably contact the segments 15. The number of the brushes are the same as that of the magnetic poles (four in this embodiment) of the direct current motor. Positive-polarity brushes 17a and 17c are disposed to slidably contact the same-phase segments 15 which are opposing (facing) each other with 180° angular interval. Negative-polarity brushes 17b and 17d are displaced 90° from the positive-polarity brushes 17a and 17c, and disposed to slidably contact the same-phase segments 15 which are opposing (facing) each other with 180° angular interval.

Figure 2:
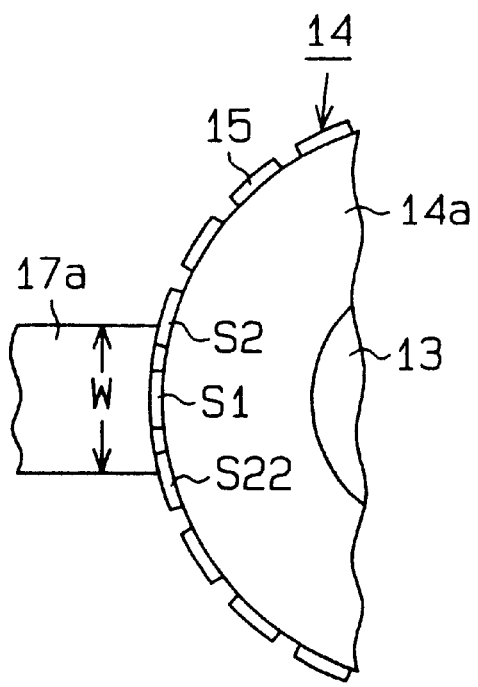
FIG. 2 is an enlarged view showing the commutator and the brush in the first embodiment.

Each brush 17a–17d is shaped as shown in FIG. 2 to have a brush width W in the direction of sliding movement of the segment 15. The width W is defined so that each brush 17a–17d bridges and contacts a maximum of three segments 15 (22nd, 1st and 2nd segments S22, S1 and S2) at the same time.

Figure 4:
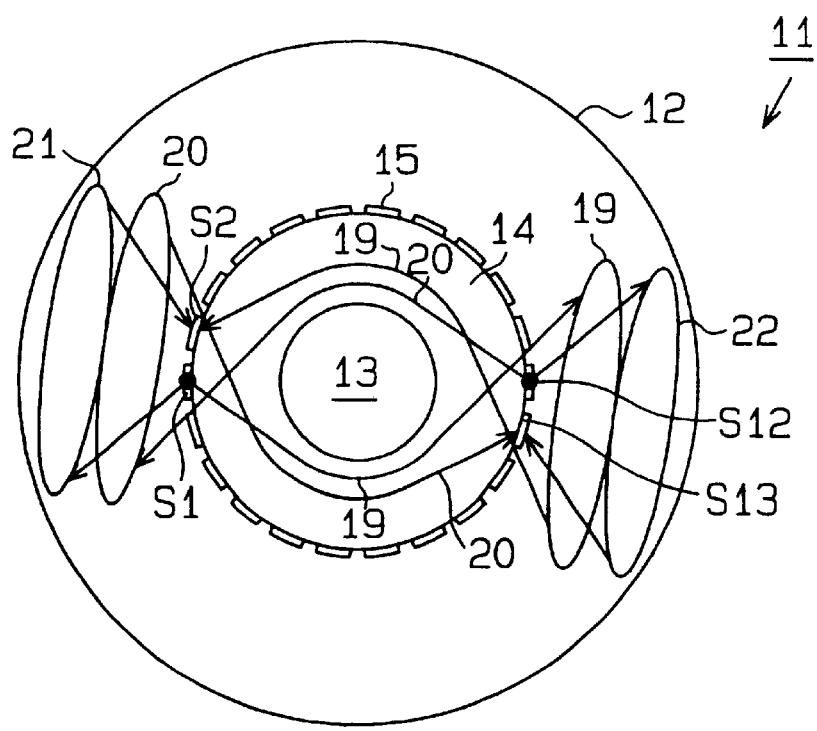
FIG. 4 is a schematic view showing windings and shorting plates in the first embodiment.

With respect to windings on the slotted core 12 of the armature 11, as shown in FIG. 4, a plurality of (two upper and lower layers) windings are wound on the slotted core 12 at positions opposing (facing) with 180° angular interval.

Specifically, as shown in FIG. 4, lower layer windings 19 and 20 are wound a predetermined number of turns (for instance, 10 turns) on the slotted core 12 as a lower (first) layer in a long-α winding shape. In this instance, the start terminal of the lower layer winding 19 is connected to one segment 15 (for instance, 1st segment S1), and the lower layer winding 19 is extended near the rotary shaft 13 while bypassing the same. The lower layer winding 19 is wound a predetermined number of turns (for instance, 10 turns) around the slotted core 12 which opposes (faces) the segment 15 (first segment S1) with 180° angular interval. The lower layer winding 19 is extended near the rotary shaft 13 again, and is connected to another segment 15 (2nd segment S2) adjacent to the segment 15 (1st segment S1).

The lower layer windings are wound (cross-winding) on the slotted core 12 in order while rotating the armature 11. When the segment 15 (12th segment S12) which opposes (faces) the segment 15 (first segment S1) with the 180° angular interval and comes to a position for winding, the start terminal of a lower layer winding 20 is connected to the 12th segment S12 and extended near the rotary shaft 13 while bypassing the same. The lower layer winding 20 is wound a predetermined number of turns (for instance, 10 turns) around the slotted core 12 (that is, the slotted core on the side of the 1st segment S1) which opposes the 12th segment S12. The lower layer winding 20 is extended near the rotary shaft 13 again, and is connected to the segment 15 (13th segment S13) adjacent to the 12th segment S12.

After the lower layer windings are wound around all over the slotted core 12 of the armature 11 in the above sequence, upper layer windings 21 and 22 are wound around the slotted core 12 as the upper layer windings in the short-α winding shape. The upper layer windings 21 and 22 are wound in the same order as winding the lower layer windings 19 and 20. The upper layer windings 21 and 22 are wound the same number of turns (for instance, 10 turns) as the lower layer windings 19 and 20.

That is, the start terminal of the upper layer winding 21 is connected to the segment 15 (first segment S1). The upper layer segment 21 is connected to the second segment S2, after being wound around the slotted core 12 which corresponds to the 1st segment S1.

The upper layer windings are wound (lap-winding) in the slotted core 12 in order while rotating the armature 11 in the similar manner. When the segment 15 (12th segment S12) which opposes (faces) the 1st segment S1 with the 180° angular interval and is in the same phase comes to a position for winding, the start terminal of the upper layer winding 22 is connected to the 12th segment S12. The upper layer winding 22 is wound around the slotted core 12 which corresponds to the 12th segment S12. The upper layer winding 22 is connected to the segment 15 (13th segment S13).

The winding operation is completed, when the upper layer windings are wound all over the slotted core 12 of the armature 11 in the above order.

The direct current motor and the commutator 14 according to the present embodiment have the following advantages.

It may happen in FIG. 1 that any one of the brushes (for instance, brush 17a) of the positive-polarity brushes 17a, 17c and negative-polarity brushes 17b, 17d does not contact the 1st segment S1 because of dislocation or jumping. In this instance, however, the current flows to the 1st segment S1 of the same phase through the conductive plate 16, as long as the opposing brush 17c of the same polarity contacts the other opposing 12th segment S12.

Further, the same-phase segments 15 are shorted through the conductive plate 16 molded in the commutator ring 14a. Thus, no separate wire nor its winding work is required. As a result, the voltage drop in the shorting wire and the influence of inductance are reduced. Further, the winding work and the production cost are reduced.

(2) Each brush 17a–17d is shaped to have a width W of surface which contacts the segments 15. The width W is defined to bridge three segments 15. That is, in any instances during rotation of the direct current motor, each brush 17a–17d contacts at least two segments at the same time.

It may occur that the brushes (for instance, positive-polarity brushes 17a and 17c) are dislocated from each other. However, when one brush (for instance, brush 17a) leaves the 22nd segment S22 and contacts the adjacent 1st segment S1, the other brush 17c can contact the 12th segment S12 which is in the same phase as the 1st segment S1 without fail. As a result, lessening of the brush life and generation of unusual noise caused by sparks, noises and the like can be restricted. Thus, the life of the direct current motor can be prolonged and the noise can be suppressed.

(3) The upper and lower layer windings 19–22 are wound in two layers on the slotted core 12 of the armature. Each lower layer winding 19, 20 is wound in the long-α shape in which each winding is connected to the segments 15 which oppose each other with 180° angular interval. Each upper layer winding 21, 22 is wound in the short-α shape in which each winding is connected to the segments 15 which oppose each other with 180° angular interval. That is, the lower layer windings 19, 20 and the upper layer windings 21, 22 are wound on the same-polarity and same-phase segments 15 which opposes with 180° angular interval in a manner to cross each other.

Further, each of the windings 19–22 are wound the same number of turns. That is, each layer winding 19–22 is evenly distributed to and wound on the segments 15 which are the same in polarity and in phase.

It may occur that the brushes 17a–17d contact the segments 15 at different timings. For instance, one of the same-polarity brushes 17a, 17c or same-polarity brushes 17b, 17d, for instance, only brush 17a or brush 17b, contacts the segment 15 earlier than the other. In this instance, the windings 19–22 of the upper layer and the lower layer respectively wound around the slotted core 12 which oppose each other are energized. Further, the windings 19–22 of the upper layer and the lower layer are wound in the same number of turns, that is, distributed uniformly or evenly. Thus, even when the timing of power supply differs, the induction force generated in the windings 19–22 are distributed evenly in a direction to cancel each other as a vector (phase).

As a result, imbalance of power supply caused by variation in the sliding-contact of the brushes 17a–17d with the segments can be reduced. Further, the fluctuation in rotation, vibration and unusual noise of the motor can be reduced more.

Further, the lower layer windings 19 and 20 are wound in the long-α winding shape. As a result, the lower layer windings 19 and 20 can be wound densely in the radially inner side of the slots. That is, occupancy of the windings in the armature 11 can be increased.

(Second Embodiment)

A second embodiment is different from the electric motor according to the first embodiment only in the construction of the commutator.

Figure 5:
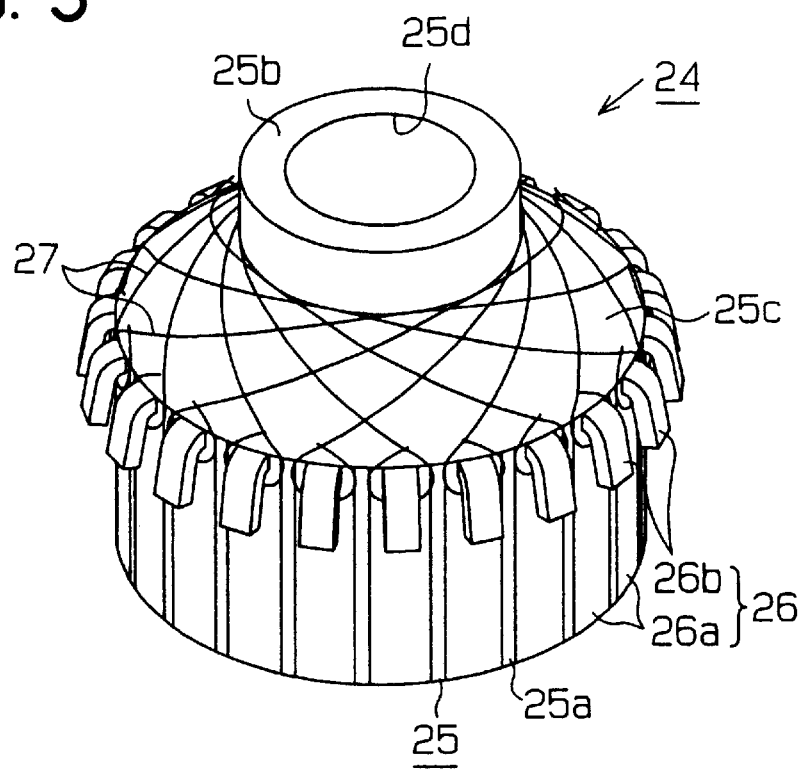
FIG. 5 is a perspective view showing a commutator according to a second embodiment of the present invention.
Figure 6:
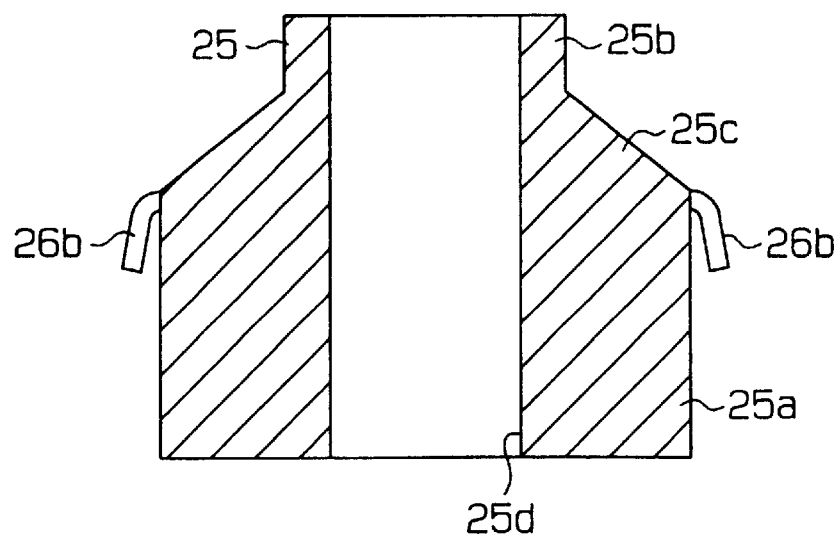
FIG. 6 is a sectional view showing the commutator in the second embodiment.

A commutator 24 according to the present embodiment has, as shown in FIGS. 5 and 6, a central cylinder 25 made of an insulating material such as resin and a plurality (for instance, 22) of segments 26 affixed to the outer periphery of the central cylinder 25.

The central cylinder 25 is comprised of a large diameter part 25a, a small diameter part 25b and a tapering protrusion part 25c formed between the large diameter part 25a and the small diameter part 25b. A through hole 25d is provided in the center of the central cylinder 25. The through hole 25d passes through the rotary shaft (not shown).

Each segment 26 is comprised of a segment body 26a and a riser 26b formed by bending the top end of the segment body 26a. The segment 26 is fixed to the large diameter part 25a to be generally flush with the outer surface of the large diameter part 25a. The segment bodies 26a of the segments 26 are arranged on the outer periphery of the large diameter part 25a at uniform angular interval.

Figure 7:
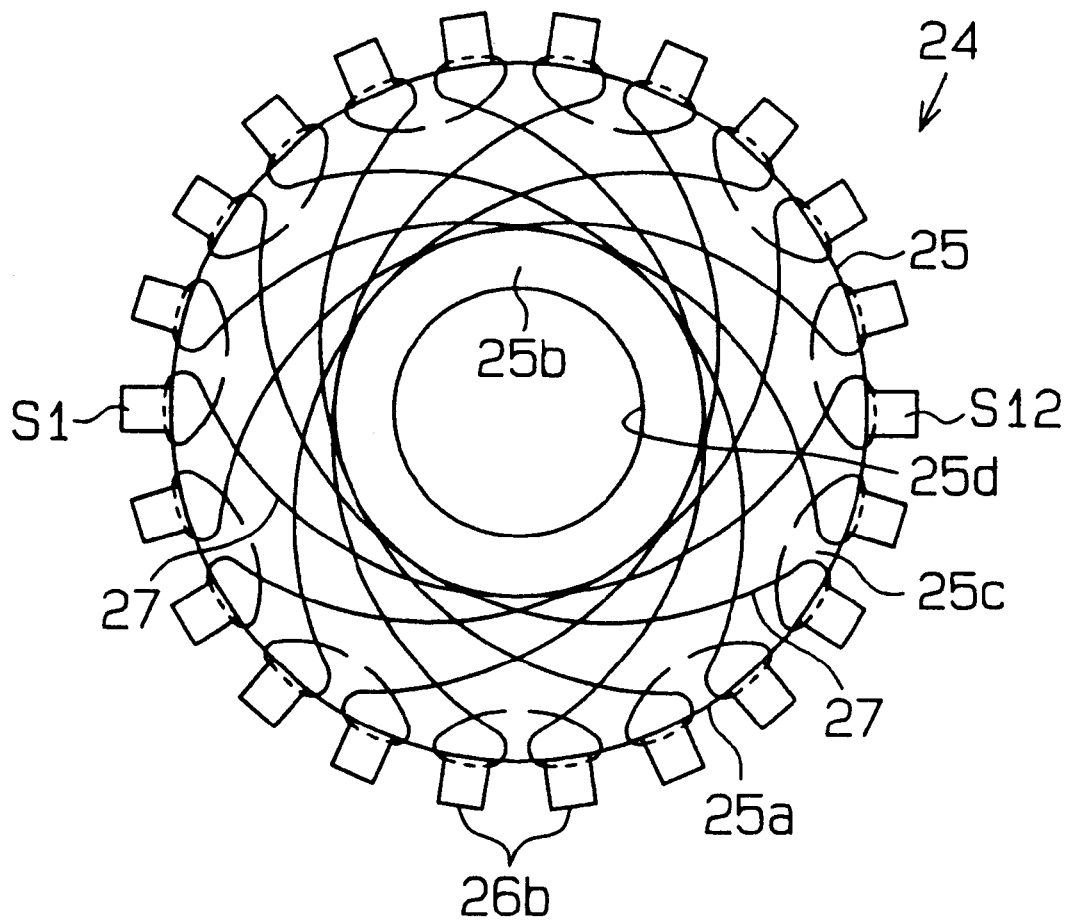
FIG. 7 is a plan view showing shorting wires in the second embodiment.

As shown in FIGS. 5 and 7, the segments 26 of the same phase (for instance, the 1st segment S1 and the 12th segment S12 which are in the same phase and opposing with 180° angular interval) is short-connected by a shorting wire 27 which is arranged as a shorting member along the outer surface of the tapering protrusion part 25c. That is, the same-phase segments 26 are shorted by the shorting wires 27 for strapping connection.

As a result, the present invention has the following advantages in addition to the above advantages (2) and (3) of the first embodiment.

(1) The same-phase segments 26 of the commutator 24 are directly connected to each other by the shorting wires 27 in the strapping connection. That is, each shorting wire 27 directly connects the same-phase segments 26 without being wound around the slotted core 12.

Compared with the case that the shorting wire is wound around the slotted core of the armature, the shorting wire 27 can be connected with ease and need not be wound unnecessarily long. Thus, any disadvantageous influence on the armature 11 can be reduced with respect to the inductance or the like.

(2) The commutator 24 is formed with the tapering protrusion part 25c. The space between the risers 26b of the adjacent segments 26 is widened due to the tapering protrusion part 25c. As a result, windings (not shown) which are connected between the adjacent risers 26b can be restricted from shorting therebetween. The windings thus connected can be cut off without being impeded by the adjacent risers 26b. That is, the winding (inclusive of the shorting wire 27) connected to the riser 26b of the segment 26 can easily be cut off.

The above embodiments may be modified as follows.

In the first embodiment, the conductive plate 16 should not be limited to the copper plate. It may be other metal plates such as a zinc plate, aluminum alloy plate or the like. The same-phase segments 15 and the conductive plate 16 may be shaped unitarily from similar conductive materials.

In the second embodiment, the tapering protrusion part 25c formed on the commutator 24 may be eliminated.

In the above first and second embodiments, the segments 15 and 26 should not be limited to twenty-two, but may be other than twenty-two. In the above embodiments, four brushes 17a–17d are arranged around the commutators 14 and 24. The brushes should not be limited to four, but six or more brushes may be arranged around the commutators 14 and 24 as long as the number is the same as that of the magnetic fields of the direct current motor. The windings on the slotted core 12 of the armature 11 may be wound in four or more even-number layers on the slotted core 12. In this instance, the windings of each layer are evenly distributed and connected for the segments 15 and 26.

Furthermore, the present invention may be applied to any electric motors having power supply brushes other than the direct current motor of the above embodiments.

What is claimed is:

1. An electric motor having power supply brushes comprising:
    a commutator having a plurality of segments disposed in a commutator ring;
    plural sets of power supply brushes held in sliding contact with the plurality of segments; and
    a shorting member for electrically connecting same-phase segments of the plurality of segments,
    wherein each of the power supply brushes has a segment contact surface width defined to bridge at least three adjacent segments at any time.

2. An electric motor as set forth in claim 1, wherein:
    the power supply brushes and magnetic poles of the motor are same in number.

3. An electric motor as set forth in claim 1, wherein:
    the shorting member includes a conductive plate connecting the same-phase segments to each other; and
    the conductive plate is molded in the commutator ring not to short with adjacent ones.

4. An electric motor as set forth in claim 1, wherein:
    the shorting member includes a shorting wire short-connecting the same-phase segments to each other; and
    the shorting wire directly short-connects the same-phase segments.

5. An electric motor as set forth in claim 4, wherein:
    the commutator is formed with a tapering protrusion convexing in an axial direction; and
    the shorting wire extends along the tapering protrusion to directly short-connect the same-phase segments.

6. An electric motor as set forth in claim 1, wherein:

windings of a same phase are wound around a same slotted core in a plurality of winding layers and connected to the same-phase segments; and the number of turns of the windings are the same among the winding layers.

7. An electric motor as set forth in claim 6, wherein:

the winding layers wound around the same slotted core includes an upper layer and a lower layer;

lower layer windings are wound in a long-α winding shape;

upper layer windings are wound in a short-α winding shape; and each of the lower layer windings and the upper layer windings is divided into the same-phase segments opposing each other with 180° interval in crossing manner.

8. An electric motor as set forth in claim 1, wherein:

the shorting member includes a conductive plate connecting the same-phase segments to each other; and the conductive plate is molded in the commutator ring not to short with adjacent ones.

9. A commutator for an armature comprising:

a commutator body including a large diameter part, a small diameter part and a tapering protrusion part, the tapering protrusion part connecting between the large diameter part and the small diameter part;

a plurality of segments disposed around an outer peripheral surface of the large diameter part; and a plurality of shorting wires extending along a surface of the tapering protrusion part between the large diameter part and the small diameter part and directly short-connecting the segments of same phase to each other.

10. A commutator according to claim 9, wherein:

the plurality of segments form pairs of adjacent segments, each pair of the adjacent segments comprising a first segment and a second segment;

one of the plurality of shorting wires connects each first segment to another one of the plurality of segments that is positioned 180 degrees around the commutator body from the each first segment to form a first wire connection;

another one of the plurality of shorting wires connects each second segment to another one of the plurality of segments that is positioned 180 degrees around the commutator body from the each second segment to form a second wire connection; and the first wire connection and the second wire connection are opposite each other about the small diameter part.

11. An electric motor having power supply brushes comprising:

a commutator having a plurality of segments disposed in a commutator ring;

plural sets of power supply brushes held in sliding contact with the plurality of segments; and a plurality of shorting wires for electrically connecting same-phase segments of the plurality of segments, wherein the commutator comprises a commutator body including a large diameter part, a small diameter part and a tapering protrusion part, the tapering protrusion part connecting between the large diameter part and the small diameter part;

wherein the plurality of segments are disposed around an outer peripheral surface of the large diameter part; and wherein the plurality of shorting wires extend along a surface of the tapering protrusion part between the large diameter part and the small diameter part and directly short-connect the same-phase segments to each other.

12. An electric motor according to claim 11, wherein each of the power supply brushes has a segment contact surface width defined to contact at least two adjacent segments at any time.

* * * * *